(12) United States Patent  (10) Patent No.: US 8,630,737 B2
Oda  (45) Date of Patent: Jan. 14, 2014

(54) TAKING OUT DEVICE HAVING FUNCTION FOR CORRECTING POSTURE OF AN ARTICLE

(71) Applicant: Fanuc Corporation, Yamanashi (JP)

(72) Inventor: Masaru Oda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/661,459

(22) Filed: Oct. 26, 2012

(65) Prior Publication Data

US 2013/0158710 A1 Jun. 20, 2013

(30) Foreign Application Priority Data

Dec. 19, 2011 (JP) ................................ 2011-277431

(51) Int. Cl.
 *G05B 19/00* (2006.01)
 *G06F 19/00* (2011.01)
(52) U.S. Cl.
 USPC .......................................... 700/259; 700/245
(58) Field of Classification Search
 USPC ............... 901/9, 47; 382/153; 623/60, 61, 64; 414/589, 591, 730, 744.1, 749.1, 754
 See application file for complete search history.

(56) References Cited

U.S. PATENT DOCUMENTS

| | | | | |
|---|---|---|---|---|
| 4,412,293 A * | 10/1983 | Kelley et al. | .................. | 700/259 |
| 4,985,846 A * | 1/1991 | Fallon | ........................... | 382/153 |
| 6,328,523 B1 * | 12/2001 | Watanabe et al. | ........ | 414/416.01 |
| 6,597,971 B2 * | 7/2003 | Kanno | .......................... | 700/245 |
| 6,721,444 B1 * | 4/2004 | Gu et al. | ....................... | 382/154 |
| 6,845,296 B2 * | 1/2005 | Ban et al. | ...................... | 700/245 |
| 7,123,992 B2 * | 10/2006 | Ban et al. | ..................... | 700/258 |
| 7,203,573 B2 * | 4/2007 | Ban et al. | ....................... | 700/258 |
| 7,313,464 B1 * | 12/2007 | Perreault et al. | .............. | 700/245 |
| 7,474,939 B2 * | 1/2009 | Oda et al. | ..................... | 700/245 |
| 7,957,580 B2 * | 6/2011 | Ban et al. | ..................... | 382/153 |
| 7,966,094 B2 * | 6/2011 | Ban et al. | ..................... | 700/260 |
| 7,996,114 B2 * | 8/2011 | Ban et al. | ..................... | 700/259 |
| 8,295,975 B2 * | 10/2012 | Arimatsu et al. | ............. | 700/216 |

(Continued)

FOREIGN PATENT DOCUMENTS

| | | |
|---|---|---|
| JP | 08-243961 A | 9/1996 |
| JP | 2004-230513 A | 8/2004 |
| JP | 2008-087074 A | 4/2008 |
| JP | 2010-069542 A | 4/2010 |

OTHER PUBLICATIONS

Japanese Office Action for Patent Application No. 2011-277431 mailed Feb. 5, 2013.

*Primary Examiner* — Khoi Tran
*Assistant Examiner* — Robert Nguyen
(74) *Attorney, Agent, or Firm* — Lowe Hauptman & Ham LLP

(57) ABSTRACT

A taking out device capable of correcting a posture of an article to be taken out and taking out the article, while considering interference between a robot hand and a container for containing the article. Since the article is inclined to the left side, the hand approaches and contacts the article from the left side. Then, the hand pushes to the right side while claws of the hand engage a hole portion of the article in order to correct the posture of the article such that the positional relationship between the article and the hand represents a reference position/posture. In this way, the hand is positioned at a second position/posture in which the posture of the article relative to the claws allows the article to be taken out.

4 Claims, 5 Drawing Sheets

(56) References Cited

U.S. PATENT DOCUMENTS

| | | | |
|---|---|---|---|
| 8,380,342 B2 * | 2/2013 | Ban et al. | 700/218 |
| 2006/0104788 A1 * | 5/2006 | Ban et al. | 414/729 |
| 2006/0200274 A1 * | 9/2006 | Watanabe et al. | 700/245 |
| 2007/0282485 A1 * | 12/2007 | Nagatsuka et al. | 700/245 |
| 2011/0223001 A1 * | 9/2011 | Martinez et al. | 414/730 |
| 2012/0165986 A1 * | 6/2012 | Fuhlbrigge et al. | 700/259 |

* cited by examiner

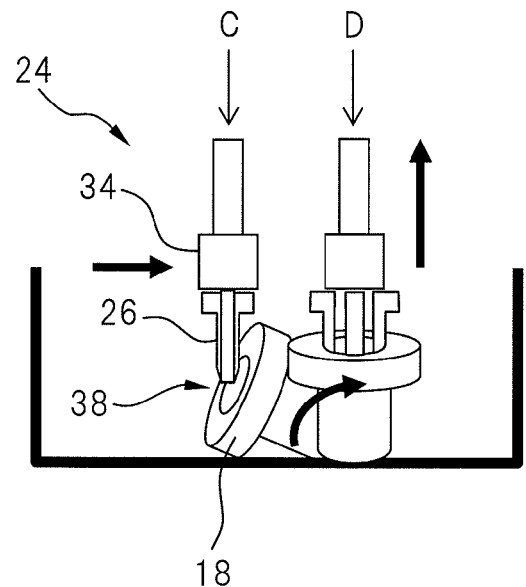
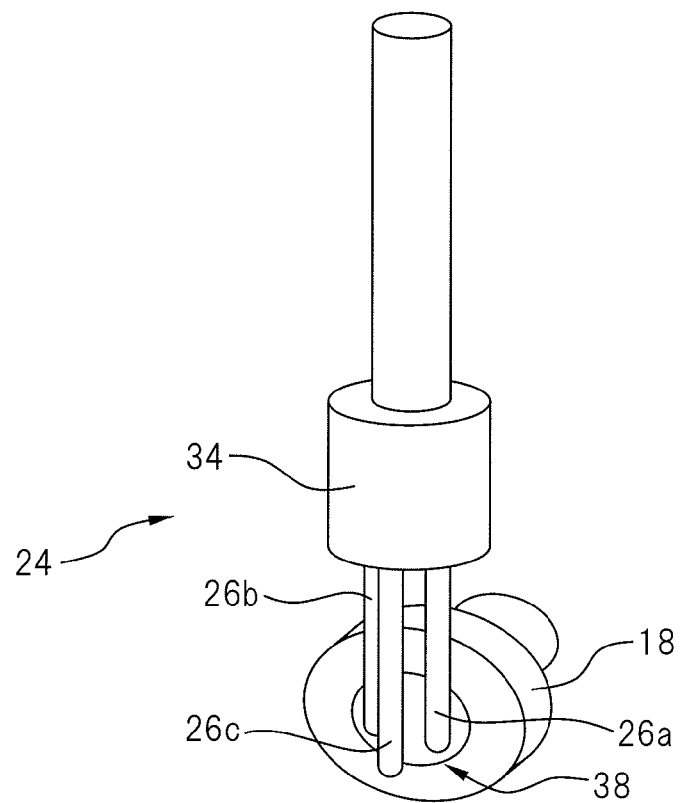

TAKING OUT DEVICE HAVING FUNCTION FOR CORRECTING POSTURE OF AN ARTICLE

RELATED APPLICATIONS

The present application claims priority from Japanese Application No. 2011-277431, filed Dec. 19, 2011, the disclosure of which is hereby incorporated by reference herein in its entirety.

BACKGROUND OF THE INVENTION

1. Field of the Invention

The present invention relates to a taking out device which takes out randomly located articles by using a robot, in particular, relates to a taking out device having a function of correcting a posture of an article to be taken out.

2. Description of the Related Art

There are known devices for taking out randomly located articles by using a robot. For example, Japanese Unexamined Patent Publication (Kokai) No. 2004-230513 describes that "hand 3 is attached to mount 41 at robot arm end 10 by means of connecting member 31. Gripping means 35 is supported by rotational supporting parts (or pivot axes) 33 and 34. By the robot controller, extendable means 32 may be extended or contracted so that gripping means 35 may represent first posture (a) and second posture (b)."

Further, Japanese Unexamined Patent Publication (Kokai) No. 2010-69542 describes that "A robot hand 24 is advanced to the workpiece holding target position (S3), and a holding state is confirmed (S4). When the holding state is not good, the workpiece holding target position is changed (S8), and the robot hand 24 is advanced until the holding state is made (S3)."

In Japanese Unexamined Patent Publication (Kokai) No. 2004-230513, the hand is structurally designed so that the hand can be flexibly operated corresponding to the position and/or posture of the workpiece to be taken out. However, such a hand may be expensive. Further, since it is necessary to change a method of taking out the workpiece corresponding to the orientation of the workpiece, a robot program may be complicated.

On the other hand, in Japanese Unexamined Patent Publication (Kokai) No. 2010-69542, the robot hand is moved forward until the adsorption state, wherein the workpiece is gripped by the robot hand, is confirmed. However, depending on the shape and/or the orientation of the workpiece, the workpiece may not be gripped merely by forwardly moving the robot hand.

SUMMARY OF THE INVENTION

An object of the present invention is to provide a taking out device capable of correcting a posture of an article to be taken out and taking out the article, while considering interference between a robot hand and a container that contains the article.

According to the present invention, a taking out device for taking out an article one-by-one by using a robot with a hand having a gripping part for gripping the article, the hand being attached to a front end of an arm of the robot, is provided, the taking out device comprising: a vision sensor which detects a position and posture of each of a plurality of articles which are randomly located in a container and detects one of the plurality of articles as an article to be taken out, the container having an inside portion defined by a wall portion and an opened upper portion; a reference operation program which is previously taught against the article to be taken out, in which a command for the hand and a robot operation command including a series of teach points, for taking out the article to be taken out by means of the robot and the hand, are described; a correction part which corrects positional information and postural information at each teach point of the series of teach points in the reference operation program, based on information from the vision sensor; a storing part which previously stores interference region information corresponding to the wall portion of the container; and a posture adjusting part which adjusts the postural information corrected by the correcting part, based on the interference region information stored in the storing part, such that the robot or the hand does not interfere with the wall portion, wherein the reference operation program is described such that, by operating the robot, the hand is positioned at a first position and posture in which the gripping part of the hand faces a gripped portion of the article to be taken out located in inclined state and the gripping part contacts a part of the article to be taken out, then, the hand is positioned at a second position and posture in which the hand is moved to correct the posture of the article to be taken out while the gripping part contacts the article to be taken out and the posture of the article to be taken out relative to the gripping part is changed such that the article can be gripped, and then, the hand grips and takes out the article to be taken out from the container based on a grip command, and wherein the posture adjusting part adjusts the postural information in relation to at least teach point corresponding to the first position and posture.

In a preferred embodiment, the hand approaches and comes into contact with the article to be taken out from a side to which the article to be taken out is inclined relative to a reference posture, and the hand pushes the article to be taken out toward the generally opposed side of the approach side so as to correct the posture of the article.

In a preferred embodiment, the article has a hole portion such that the article can be gripped at an inner diameter portion thereof, and the griping part has at least three claws which enter the hole portion of the article and grip the article, and wherein an entering direction of the at least three claws into the hole portion of the article is determined such that at least two claws of the at least three claws are moved in advance of the remaining claw, and simultaneously enter the article.

In a preferred embodiment, the vision sensor is constituted by a first camera which extracts the article to be taken out while defining an entire container as a search range and a second camera which detects the position and posture of the article to be taken out.

In a preferred embodiment, the vision sensor is configured to detect an error in the position of the container, and the error is used to correct the interference region information.

BRIEF DESCRIPTION OF THE DRAWINGS

The above and other objects, features and advantages of the present invention will be made more apparent by the following description of the preferred embodiments thereof with reference to the accompanying drawings wherein:

FIG. 5 is a view explaining the operation for correcting the posture of the article to be taken out by the hand;

FIG. 6 is a view showing a state wherein the hand approaches the article when the hand has three claws;

DETAILED DESCRIPTION

Figure 1:
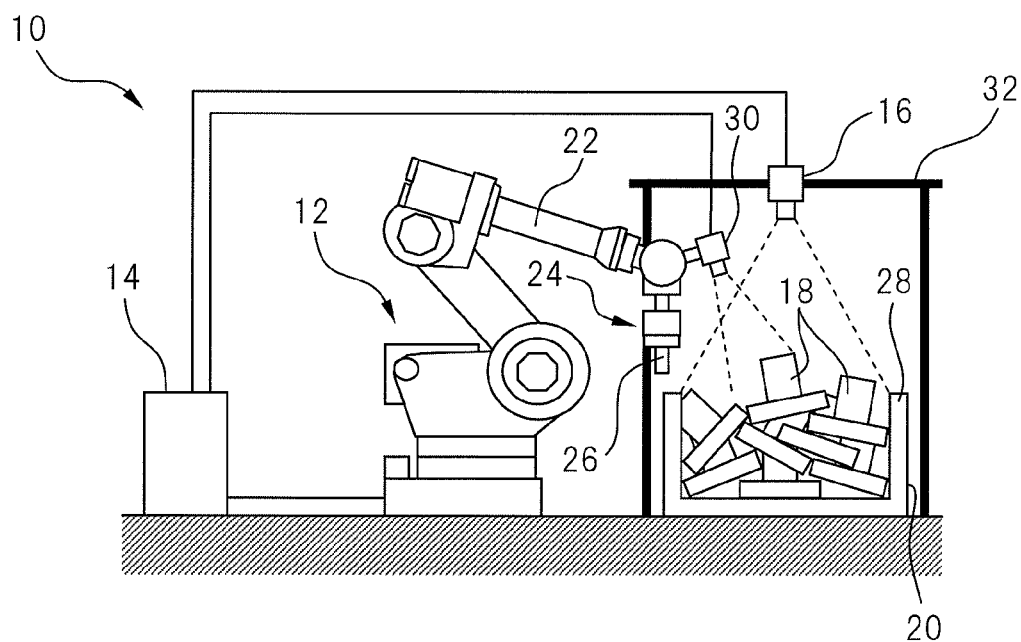
FIG. 1 is a view of a schematic configuration of a taking out device according to an embodiment of the present invention.

FIG. 1 is a view showing a schematic configuration of an article taking out device 10 according to a preferred embodiment of the present invention. Taking out device 10 includes a robot 12, a robot controller 14 which controls robot 12 to allow the robot to carry out a series of operations as below, and a first vision sensor (or a camera in the illustrated embodiment) 16 connected to robot controller 14. Taking out device 10 is used to take out an article one-by-one, from a container 20 in which a plurality of articles (the same kind of articles in the embodiment) 18 are randomly located.

Robot 12 has a movable section such as a robot arm 22, and a robot hand 24 attached to a front end of robot arm 22. Robot hand 24 has a gripping part 26 configured to grip each article 18. As shown, container 20 has a wall portion 28 defining an inner portion of the container, and an upper portion of container 20 is opened such that gripping part 26 of robot hand 24 can enter the inside of container 20.

Camera 16 may capture articles 18 within container 20, preferably may capture an entire of container 20. An image obtained by camera 16 is processed by controller 14 or another image processor (not shown) connected to controller 14. Then, the position and posture (hereinafter, also referred to as the position/posture) of each of the imaged articles are determined, and controller 14 extracts (or selects) an article to be taken out based on the position/posture of the imaged plurality of articles. In this way, by using the image obtained by camera 16, the position and posture of the articles (including the article to be taken out) may be detected. In this regard, a second vision sensor (a camera in the illustrated embodiment) 30, which is separated from camera 16, may detect the position and posture of the articles. When camera 30 is used, two kinds of cameras (i.e., first camera 16 for detecting a relatively wide area and second camera 30 for detecting the position/posture of each article or the article to be taken out) may be used, whereby the detection with high accuracy can be effectively carried out.

In the illustrated embodiment, first camera 16 is fixed to a dedicated pedestal 32, and second camera 30 is attached to a movable part such as robot arm 22. However, the both cameras may be fixed to pedestal 32, etc., otherwise, the both cameras may be attached the movable part such as robot arm 22. Further, the first or second camera may be configured to detect an error of the position of container 20. In this case, interference region information as described below may be corrected by using the error of the position of container 20.

Figure 2:
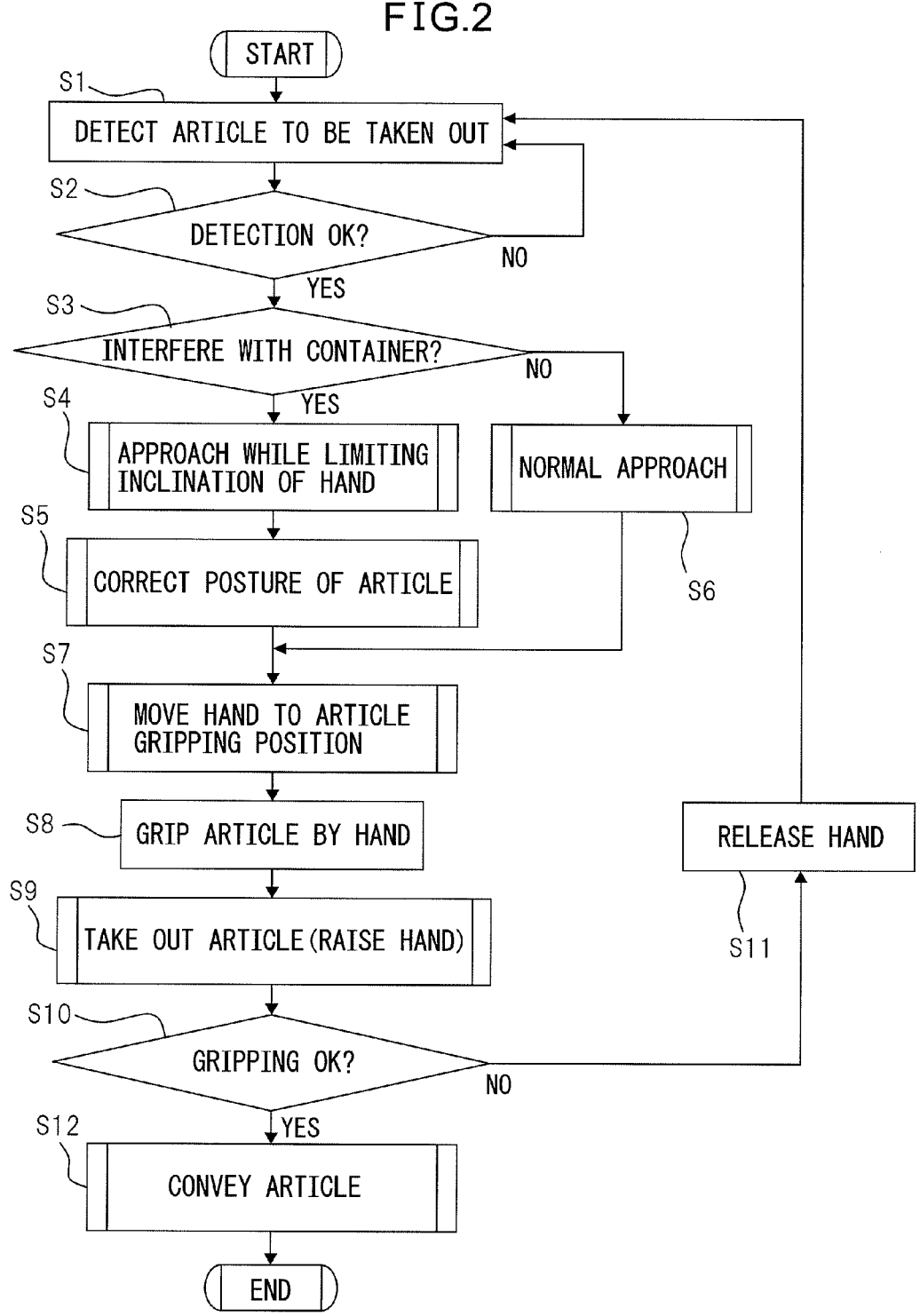
FIG. 2 is a flowchart explaining a taking out process of the taking out device of the invention.

Next, the procedure for taking out the article using taking out device 10 is explained with reference to a flowchart of FIG. 2 and associating drawings. First, a two-dimensional image of an entire region, where a plurality of articles 18 are randomly located, is obtained by camera 16, and the position and posture of each of articles 18 are detected so as to detect (or select) one article to be taken out (step S1). As the article to be taken out, for example, an article which exists at a higher level among the randomly located articles, or an article with which no other article overlaps, is detected.

Figure 3A:
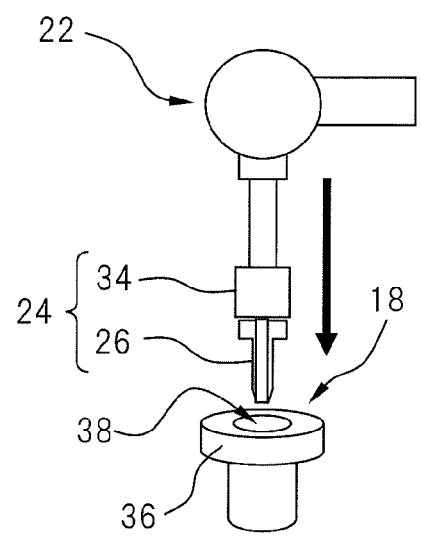
FIG. 3a is a view showing the positional relationship between a hand and an article before the hand takes out the article.

After the article to be taken out is detected (step S2), it is judged whether robot arm 22 or hand 24 interferes with container 20 when gripping part 26 is moved to grip the article to be taken out (step S3). In this regard, prior to performing step S3, as shown in FIG. 3a, the position/posture of hand 24, relative to article 18 immediately before the operation for gripping article 18 by hand 24, is previously taught, and a reference operation program, in which a robot operation command including a series of teach points and a command for hand 24 are described, is generated and stored in a memory, etc., of controller 14. In the embodiment, hand 24 has three claws as gripping part 26, and a chuck 34 which connects the three claws to the front end of arm 22 so that the three claws are movable in the radial direction.

Figure 3B:
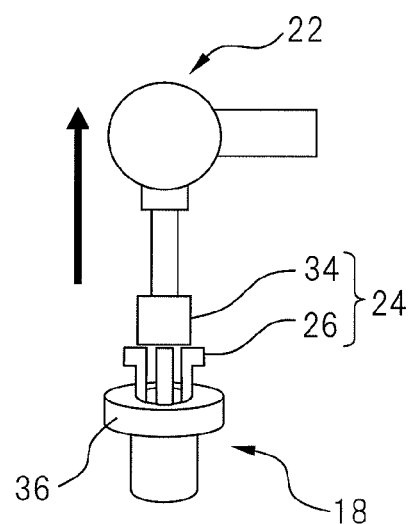
FIG. 3b is a view showing a state wherein the hand takes out the article.

Article 18 has a gripped portion which may be gripped by gripping part 26. In the illustrated embodiment, article 18 has a generally column shape with a flange 36, and a hole portion 38 generally concentric with a center axis of the column, as the gripped portion, to which gripping part 26 (the three claws in the embodiment) may be inserted. Therefore, as shown in FIG. 3a, at reference position/posture of the hand immediately before hand 24 grips article 18, three claws 26 can simultaneously enter hole portion 38 of article 18 when arm 22 is moved in the longitudinal direction of the claw, i.e., a front end of claw 26 faces an inlet of hole portion 38 in the advancing direction of the arm while being away from a predetermined distance from the inlet. In this case, when article 18 is taken out by hand 24, as shown in FIG. 3b, arm 22 is moved (downwardly in the illustrated embodiment) so that claws 26 enter hole portion 38, and then three claws 26 are radially moved away from each other by chuck 34, whereby the claws contact an inner surface of hole portion 38 and grip article 18. Then, arm 22 is upwardly moved while keeping this state, and article 18 is conveyed to a predetermined place.

Figure 4:
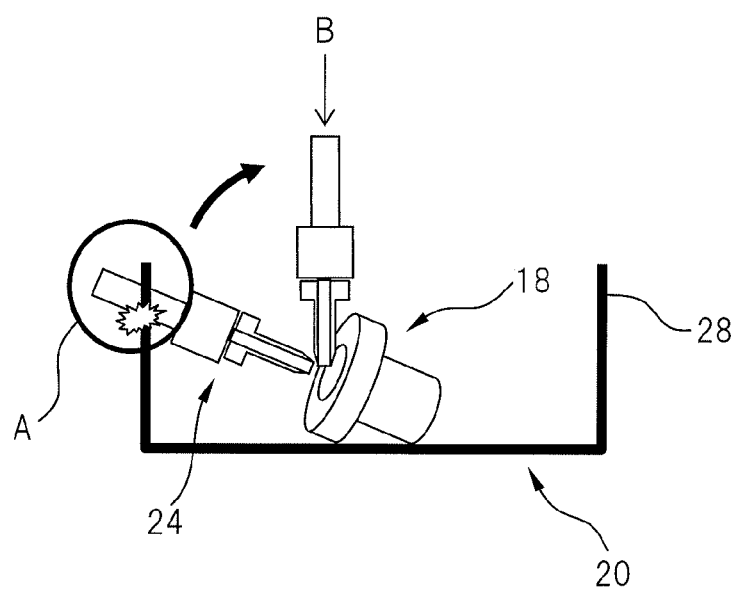
FIG. 4 is a view showing a state wherein the hand interferes with the container since the article to be taken out is inclined and a state wherein the posture of the hand is limited in order to avoid the interference.

When an interference occurs, positional information and postural information at each teach point of a series of teach points in the reference operation program are corrected based on information from vision sensor 16 or 30. However, as shown in FIG. 4, in the case that article 18 detected as an object to be taken out is inclined (i.e., hole portion of the article is opened in the direction which is significantly different from the upward vertical direction), hand 24 may interfere with (wall portion 28 of) container 20 (as shown in section "A" of FIG. 4) when the position/posture of hand 24 is changed to the reference position/posture as shown in FIG. 3a. In order to judge the occurrence of the interference, an interference region information, which corresponds to wall portion 28 of container 20, is previously stored in a memory, etc., of controller 14.

In the case of FIG. 4, it is judged that "the interference occurs" in step S3, and the procedure progresses to step S4 as described below. On the other hand, when it is judged that "the interference does not occur" in step S3, the taking out operation as shown in FIG. 3b can be carried out. Therefore, a normal approaching posture is maintained (step S6), and hand 24 may be moved to the article gripping position as shown in FIG. 3b (step S7).

In step S4, in relation to the corrected positional information and postural information at each teach point of the series of teach points in the reference operation program, postural information at each teach point is adjusted such that hand 24 does not interfere with container 20, based on the stored interference region information. By virtue of the adjustment, hand 24 is positioned at a first position/posture wherein claw 26 of hand 24 faces hole portion 38 of article 18 located in the inclined state, and claw 26 contacts a portion of article 18. For example, as shown in section "B" of FIG. 4, although the inclination of hand 24 does not coincide with the inclination of article 18, the interference between the hand and container 20 (wall portion 28) is avoided. Such postural adjustment is applied to at least a teach point corresponding to the first position/posture.

In the next step S5, an operation for correcting the posture of article 18 to be taken out by using hand 24 is carried out. For example, since article 18 to be taken out is significantly inclined relative to the posture in which hand 24 can represent the reference position/posture without interfering with container 20 as shown in FIG. 3a, hand 24 approaches and comes into contact with article 18 to be taken out from a side to which the article is inclined (the left side), and hand 24 pushes article 18 to be taken out toward the side opposed to the approach side so as to correct the posture of the article.

For example, as shown in section "C" of FIG. 5, since article 18 to be taken out is inclined to the left side relative to the reference posture (i.e., the state wherein hole portion 38 is opened in the upward vertical direction), hand 24 approaches and comes into contact with article 18 from the left side. Next, as shown in section "D" of FIG. 5, claw 26 pushes article 18 to the right side while engaging hole portion 38, and corrects the posture of the article such that the positional relationship between the article and the hand corresponds to the state as shown in FIG. 3a or 3b. In this way, hand 24 is positioned at a second position/posture in which the posture of article 18 to be taken out relative to claws 26 allows the article to be gripped.

In the embodiment, as the configuration for engaging the gripping part with the article, the hole portion is formed in the article and the claws are formed on the gripping part. However, any configuration can be used as long as the hand can correct the posture of the article by moving the hand while contacting the article. For example, a protrusion may be formed on the article, and a recess adapted to engage the protrusion may be formed in the gripping part.

By virtue of the posture correcting operation in step S6, hand 24 can be moved to the position/posture in which the hand can grip the article (step S7), and then article 18 to be taken out is gripped by hand 24 (step S8). In the embodiment of FIG. 5, hand 24 is downwardly moved such that claws 26 are inserted into hole portion 38 of article 18 as shown in section "D," and chuck 34 is opened such that three claws 26 are radially moved away from each other and the claws contact the inner surface of hole portion 38, whereby article 18 can be gripped.

Next, a taking out operation of article 18 gripped by hand 24 (in the embodiment, a rising motion of hand 24) is carried out (step S9). In this regard, step S10 may be carried out for confirming that hand 24 grips article 18. For example, when hand 24 is constituted by chuck 34 and claws 26 as in the embodiment, a detecting means such as a stroke sensor (not shown), for detecting a degree of opening of three claws 26, may be provided to chuck 34. When three claws 26 are completely opened, it may be judged that the article is not gripped by the claws, and then, hand 24 may be once released (step S11) and the procedure may restart from step S1. On the other hand, when three claws 26 are not fully opened and the degree of opening corresponds to the inner diameter of hole portion 38 of article 18, it may be judged that the article is correctly gripped by the hand, and then the article may be conveyed to a predetermined place (step S12). At least some of the operations as shown in FIG. 2 may be described in the reference operation program as mentioned above.

Figure 7A:
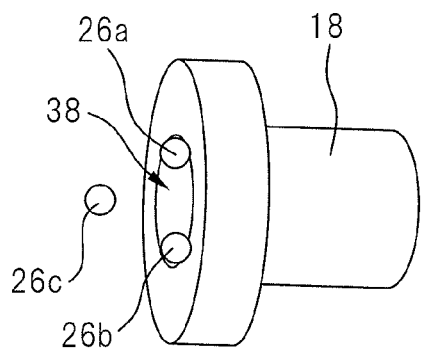
FIG. 7a is a view schematically showing a state wherein two claws of the three claws engages the article.
Figure 7B:
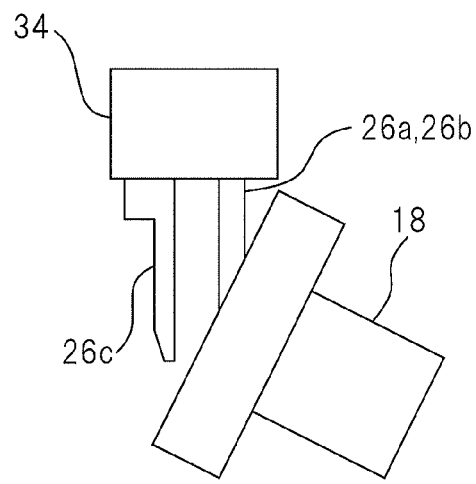
FIG. 7b is a view showing an example wherein the article is taken out by the two claws.

FIG. 6 is a view showing the state wherein hand 24 approaches inclined article 18 to be taken out when hand 24 has three claws 26. As shown in FIG. 6, it is advantageous to move hand 24 such that two claws 26a and 26b among three claws 26 simultaneously enter hole portion 38 of article 18 in advance of remaining claw 26c. By virtue of this, as shown in FIG. 7a, the inner diameter portion of article 18 (concretely, the opposed portions of the inner surface of hole portion 38) may be gripped by two claws 26a and 26b only. Therefore, as shown in FIG. 7b, article 18 may be taken out by hand 24 even when the posture of article 18 is not sufficiently corrected (for example, the posture of the article cannot be corrected to the posture as shown in section "D" of FIG. 5).

According to the present invention, in the taking out operation of randomly located articles, when the posture of the hand cannot be aligned with the posture of the article to be taken out due to the interference between the hand and the container, the posture of the article can be corrected and can be taken out by the hand. When correcting the posture of the article to be taken out, it is preferable that the hand approaches and comes into contact with the article to be taken out from a side to which the article to be taken out is inclined relative to a reference posture, and the hand pushes the article to be taken out toward the generally opposed side of the approach side so as to correct the posture of the article.

When gripping the hole portion of the article by means of three claws, by moving the hand in the direction along which two of the three claws may be simultaneously inserted into the hole portion, the article can be gripped and taken out by the two claws even when the postures of the hand and the article to be taken out do not completely coincide with each other and the hand is not fully inserted into the hole portion.

By using the vision sensor for capturing the entire of the inside of the container and the other vision sensor for detecting the position/posture of each article, the detection may be effectively carried out with high accuracy.

By detecting the position of the container by using the vision sensor, the interference region information may be preferably corrected based on an error of the install location of the container.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A taking out device for taking out an article one-by-one by using a robot with a hand having a gripping part for gripping the article, the hand being attached to a front end of an arm of the robot, the taking out device comprising:
   a vision sensor which detects a position and posture of each of a plurality of articles which are randomly located in a container and detects one of the plurality of articles as an article to be taken out, the container having an inside portion defined by a wall portion and an opened upper portion;
   a reference operation program which is previously taught against the article to be taken out, in which a command for the hand and a robot operation command including a series of teach points, for taking out the article to be taken out by means of the robot and the hand, are described;
   a correction part which corrects positional information and postural information at each teach point of the series of teach points in the reference operation program, based on information from the vision sensor;
a storing part which previously stores interference region information corresponding to the wall portion of the container; and
a posture adjusting part which adjusts the postural information corrected by the correcting part, based on the interference region information stored in the storing part, such that the robot or the hand does not interfere with the wall portion,
wherein the reference operation program is described such that, by operating the robot, the hand is positioned at a first position and posture in which the gripping part of the hand faces a gripped portion of the article to be taken out located in inclined state and the gripping part contacts a part of the article to be taken out, then, the hand is positioned at a second position and posture in which the hand is moved to correct the posture of the article to be taken out while the gripping part contacts the article to be taken out and the posture of the article to be taken out relative to the gripping part is changed such that the article can be gripped, and then, the hand grips and takes out the grip command,
wherein the posture adjusting part adjusts the postural information in relation to at least one teach point corresponding to the first position and posture,
wherein the article has a hole portion such that the article can be gripped at an inner diameter portion thereof, and the griping part has at least three claws which enter the hole portion of the article and grip the article, and
wherein an entering direction of the at least three claws into the hole portion of the article is determined such that at least two claws of the at least three claws are moved in advance of the remaining claw, and simultaneously enter the article.

2. The taking out device as set forth in claim 1, wherein the hand approaches and comes into contact with the article to be taken out from a side to which the article to be taken out is inclined relative to a reference posture, and the hand pushes the article to be taken out toward the generally opposed side of the approach side so as to correct the posture of the article.

3. The taking out device as set forth in claim 1, wherein the vision sensor is constituted by a first camera which extracts the article to be taken out while defining an entire container as a search range and the article to be taken out.

4. The taking out device as set forth in claim 1, wherein the vision sensor is configured to detect an error of the position of the container, and the error is used to correct the interference region information.

* * * * *